(12) United States Patent (10) Patent No.: US 10,726,451 B1
Plankey et al. (45) Date of Patent: *Jul. 28, 2020

(54) SYSTEM AND METHOD FOR CREATING AND MANAGING MULTIMEDIA SALES PROMOTIONS

(71) Applicants: James E Plankey, Arlington Heights, IL (US); Thomas G Gallaher, Lake St. Louis, MO (US)

(72) Inventors: James E Plankey, Arlington Heights, IL (US); Thomas G Gallaher, Lake St. Louis, MO (US)

( * ) Notice: Subject to any disclaimer, the term of this patent is extended or adjusted under 35 U.S.C. 154(b) by 278 days.

This patent is subject to a terminal disclaimer.

(21) Appl. No.: 15/865,029

(22) Filed: Jan. 8, 2018

Related U.S. Application Data

(63) Continuation-in-part of application No. 14/313,171, filed on Jun. 24, 2014, now Pat. No. 9,865,007, which
(Continued)

(51) Int. Cl.
*G06Q 30/02* (2012.01)
*G06F 3/16* (2006.01)
*G06F 3/0482* (2013.01)

(52) U.S. Cl.
CPC ....... *G06Q 30/0276* (2013.01); *G06F 3/0482* (2013.01); *G06F 3/165* (2013.01)

(58) Field of Classification Search
CPC ......... G06F 17/30247; G06F 17/30876; G06F 21/78; G06F 17/30056; G06F 17/3002; G06F 17/218; G06F 17/24
See application file for complete search history.

(56) References Cited

U.S. PATENT DOCUMENTS 6,157,747 A 12/2000 Szeliski et al.
6,307,550 B1 10/2001 Chen et al.
(Continued)

OTHER PUBLICATIONS

Spinning Car Camera App | 360 Car Camera Technology [online]. Spincar.com. Retrieved from the Internet on Jan. 7, 2018 <URL:https://spincar.com/>.
(Continued)

*Primary Examiner* — Angelica Ruiz
(74) *Attorney, Agent, or Firm* — Creativenture Law, LLC; Dennis J M Donahue, III; Kevin Staed

(57) ABSTRACT

A system and method for creating and managing multimedia sales promotions with a multimedia dashboard application running on a computing device that is in networked communication with an inventory database for a particular retailer and is also in operative communication with a distribution server. In the preferred embodiment, the computing device is a handheld smartphone or tablet computer capable of operating the fully integrated multimedia sales promotion system. The multimedia dashboard application includes an item selector, a multimedia recording module, multimedia editors, and a distribution controller. The same multimedia dashboard application is used to record multimedia segments, select segments to be uploaded to and downloaded from the inventory database, edit the segments to produce multimedia promotions, and control the distribution of the promotions which provides users with a simplified and integrated system and process to market their goods.

20 Claims, 14 Drawing Sheets

Related U.S. Application Data is a continuation-in-part of application No. 13/858,730, filed on Apr. 8, 2013, now abandoned.

(60) Provisional application No. 62/518,216, filed on Jun. 12, 2017, provisional application No. 61/838,684, filed on Jun. 24, 2013, provisional application No. 61/641,737, filed on May 2, 2012.

(56) References Cited

U.S. PATENT DOCUMENTS

| | | |
|---|---|---|
| 2001/0034690 A1 | 10/2001 | Joseph |
| 2001/0053284 A1 | 12/2001 | Shin |
| 2003/0036964 A1 | 2/2003 | Boyden |
| 2004/0139318 A1* | 7/2004 | Fiala .............. G06Q 20/3558 713/165 |
| 2006/0069611 A1 | 3/2006 | Litt et al. |
| 2006/0259589 A1 | 11/2006 | Lerman et al. |
| 2007/0028172 A1 | 2/2007 | Greer |
| 2007/0172216 A1 | 7/2007 | Lai |
| 2008/0071553 A1 | 3/2008 | Hamadi |
| 2010/0030578 A1 | 2/2010 | Siddique et al. |
| 2010/0175091 A1 | 7/2010 | Revell |
| 2011/0113363 A1* | 5/2011 | Hunt .................. G06F 3/0481 715/800 |
| 2011/0288914 A1 | 11/2011 | Guthrie |
| 2013/0066750 A1 | 3/2013 | Siddique et al. |
| 2013/0212521 A1* | 8/2013 | Fedoseyeva .......... G06Q 10/00 715/781 |
| 2013/0215116 A1* | 8/2013 | Siddique ............ G06Q 30/0643 345/420 |
| 2013/0226850 A1 | 8/2013 | Hannuksela et al. |
| 2014/0193087 A1 | 7/2014 | Conwell |
| 2014/0344294 A1* | 11/2014 | Skeen ................. H04L 65/4084 707/754 |
| 2016/0224943 A1* | 8/2016 | Chavan .............. G06Q 10/1053 |

OTHER PUBLICATIONS

Augmented Vehicle Imagery [online]. Car360, Inc. Retrieved from the Internet on Jan. 7, 2018 <URL:https://car360.com/>.

How to Make "Spinning" Vehicle Photography [online]. blog, 2006, Found Photography. Retrieved from the Internet on Jan. 7, 2018 <URL:https://www.foundphotography.com/2006/03/how-to-make-spinning-vehicle-photography/>.

Easy Way to Create 360 Degree Animations of Products [online]. article, 2012, VideoUniversity. Retrieved from the Internet on Jan. 7, 2018 <https://www.videouniversity.com/easy-way-to-create-360-degree-animation-of-products>.

* cited by examiner

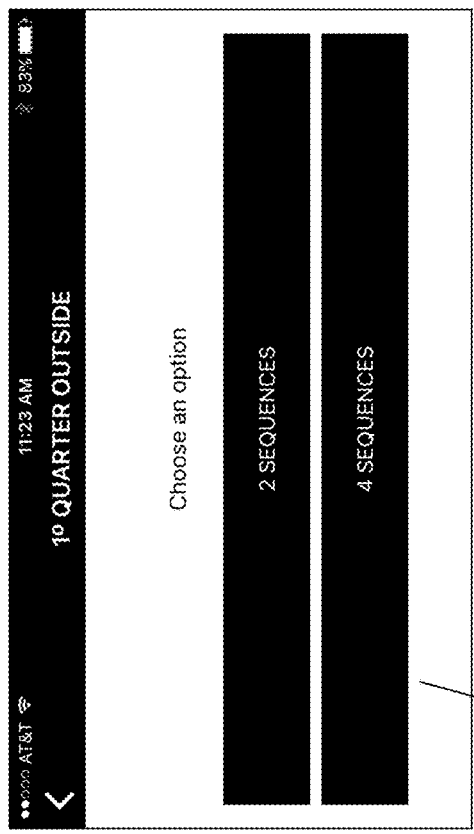

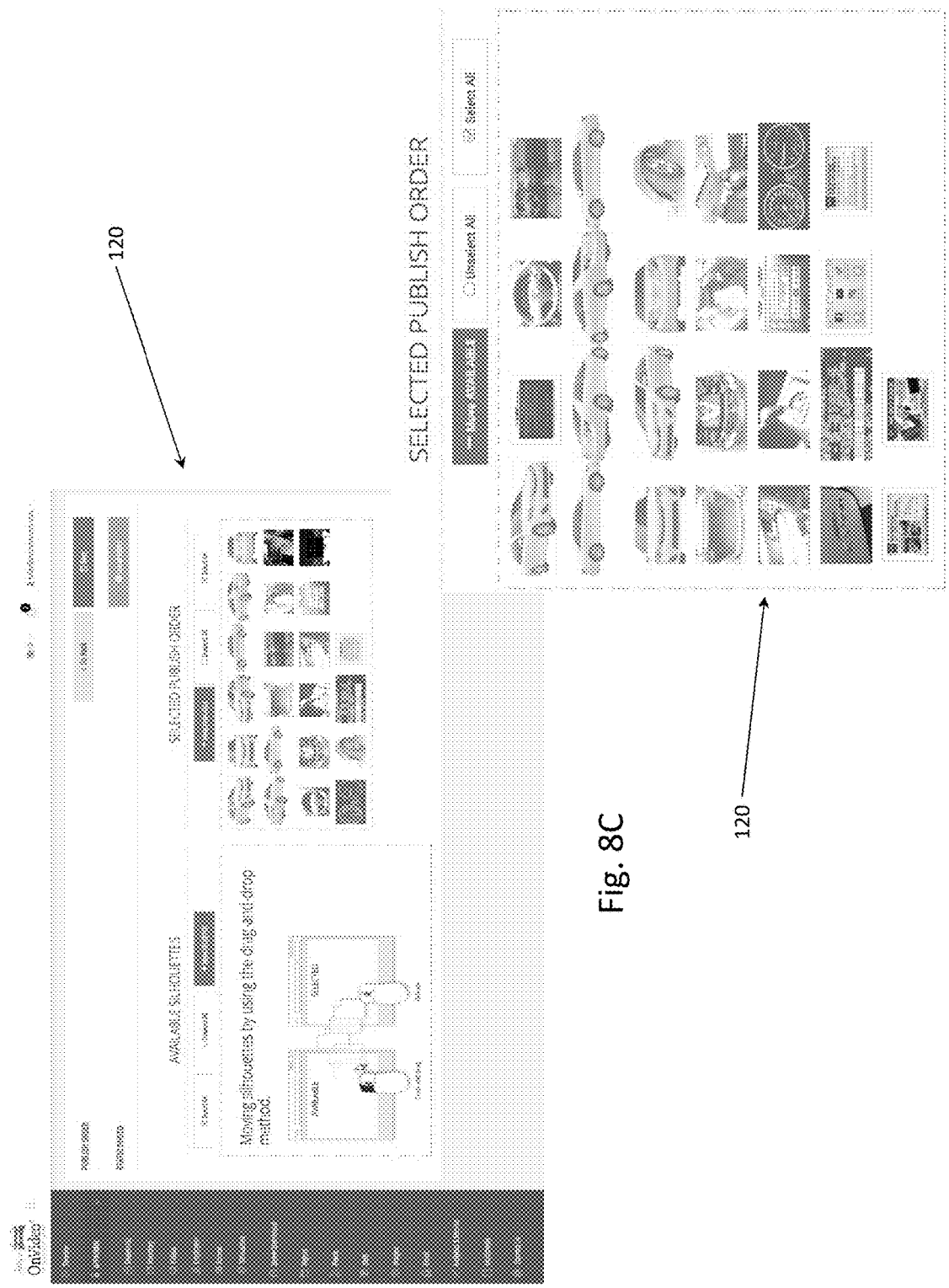

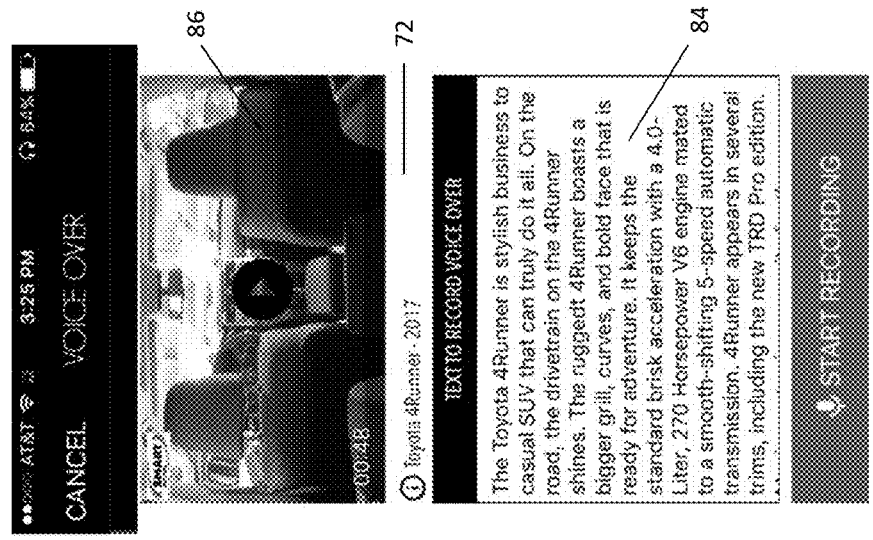
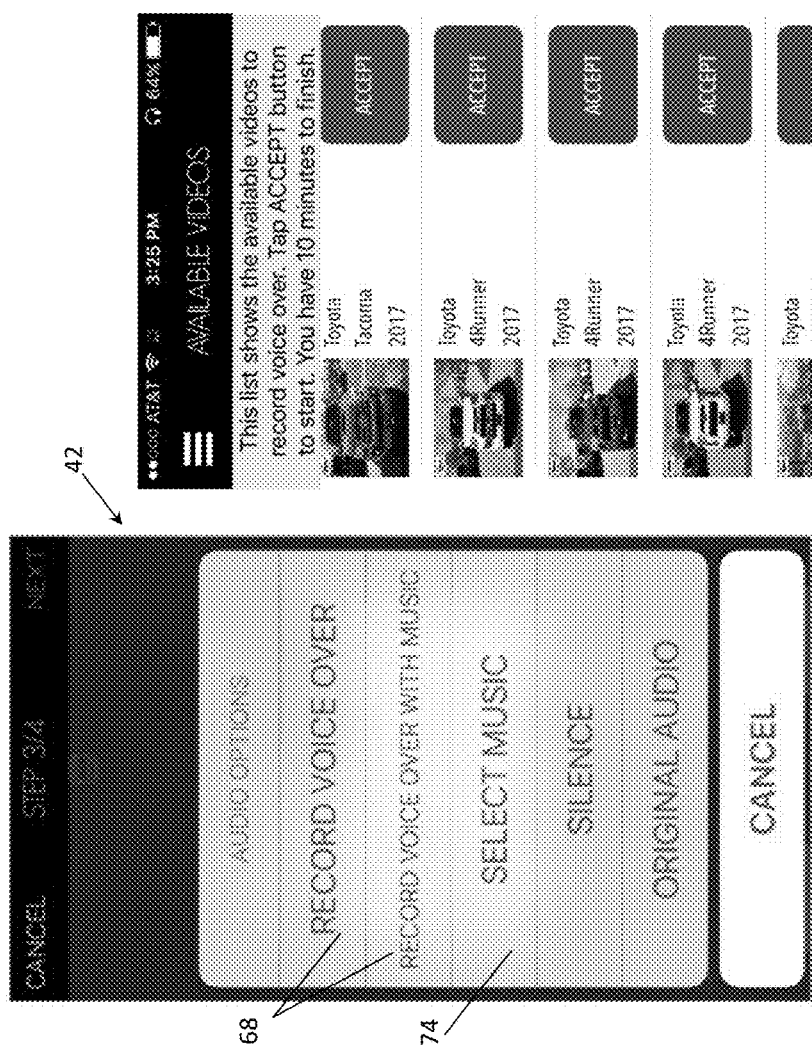
Fig. 9A  Fig. 9B  Fig. 9C

SYSTEM AND METHOD FOR CREATING AND MANAGING MULTIMEDIA SALES PROMOTIONS

CROSS-REFERENCE TO RELATED APPLICATIONS

This application is a continuation-in-part of U.S. patent application Ser. No. 14/313,171 filed on Jun. 24, 2014 and claims priority to U.S. Provisional Patent Application No. 62/518,216 filed on Jun. 12, 2017. U.S. patent application Ser. No. 14/313,171 is a continuation-in-part of U.S. patent application Ser. No. 13/858,730 filed on Apr. 8, 2013 and claims priority to U.S. Provisional Patent Application No. 61/838,684 filed on Jun. 24, 2013. U.S. patent application Ser. No. 13/858,730 claims priority to U.S. Provisional Patent Application No. 61/641,737 filed on May 2, 2012.

STATEMENT REGARDING FEDERALLY SPONSORED RESEARCH

Not Applicable.

APPENDIX

Not Applicable.

BACKGROUND OF THE INVENTION

Field of the Invention

The present invention relates to the field of sales, more particularly, to the field of multimedia sales promotions through a software and method for selling products through the software that enables a user to create, manage, upload and display information, videos, and pictures on a web-based media portal from a single system.

Related Art

It is often useful in sales to provide immersive promotional materials to display products to potential buyers. This is particularly true in automotive sales. It is well known in the field that ads featuring pictures of vehicles will attract more attention than text alone, and if at auction, command a higher price. This is true in part because it is important for the customer to get a detailed understanding of the visual condition of the vehicle. Even more importantly, detailed photographs implant imagery of the vehicle in the prospective buyer's mind and implant them with the "fantasy" of owning the vehicle.

Automotive retailers have taken this concept a step further and are now integrating video tours of their vehicles in their classifieds and promotional materials. Video is becoming the first media choice for prospective buyers on the web and mobile devices. Approximately eighty percent (80%) of all auto shoppers pursue online videos in their research, and half of all car shoppers watch at least thirty (30) minutes of video during the buying process.

Moreover, video has the potential to motivate buyers like no other media. A video gives shoppers the sense that they're standing beside the car. They can see it, hear it, learn about it, almost touch it—they may even dream about it. A well-made video helps a buyer visualize owning the car. Buyers will research countless sites before narrowing their selection, and when they're ready to move they typically only visit one or two dealers. That is why it is absolutely critical for retailers to make an impression on potential buyers with their classifieds.

Organizing the various media on the vehicles in an inventory is a difficult task. This is particularly true when video or pictures are custom edited for particular consumers, and multiple salespersons would like to make changes to the content. In the current market, retailers don't have a complete custom solution to edit photos, incorporate additional sound tracks to existing video, and accommodate multiple users. Once the original photos and video are taken, they cannot be edited and organized by the retailer in a convenient manner. A voiceover may not be done in the field because of ambient noises, such as wind, cars, airplanes, or other noises that distort the recording. Accordingly, there is a need in the art for a convenient way to organize multimedia promotional materials for large stocks of merchandise.

Another problem arises in the art as marketing a product on different web portals including a website, such as YouTube, Facebook, cars.com, etc., requires multiple logins, which may be time consuming and tedious. For dealerships, the industry standard is to take photos first, and then the photos may be processed through an elaborate PowerPoint styled stitching and called a video. Further, photos and video must be shot on multiple devices, including a camera, video camera, or a smartphone, then the photos and videos need to be uploaded to a desktop computer or laptop computer. With the computer, photos, and video can be edited, then media matched to VIN, or stock number, then uploaded to an appropriate retailer website, online shopping bazaar, or other web vendor. For the private seller, media can be loaded, but only one vendor at a time. The current process is time consuming and requires a user to take multiple steps. Further, the current process limits a private seller to upload the content to one web vendor at a time and video, photos and audio may be limited or missing altogether. As can be seen, there is a need for easily uploading of information to a web-based media portal from a single system.

An example of a known multimedia sales promotion systems in the prior art can be seen in US Pat. App. No. 2001/0034690 ("Joseph") which teaches a computer system that allows a user to add images on a display for use in a multimedia sales promotion that is hosted on a distribution server. However, the Joseph reference and similar systems in the prior art do not teach or suggest the use of a multimedia dashboard application that is in networked communication with the distribution server and that can also operate a camera and microphone within the system to create multimedia segments such as photos, video, and audio recordings, nor do they teach or suggest using a multimedia editor within the same dashboard to modify the multimedia segments and produce the multimedia sales promotion, nor do they teach or suggest an inventory database that is accessed multiple users running by the same dashboard application to produce unique multimedia sales promotions such as by using the same multimedia body segment with customized intros and outros that the users can produce on the dashboard application which they also use to record their intros and outros, nor do they teach or suggest that the same multimedia dashboard application that is used to create and edit the multimedia segments and promotions can manage promotions stored on the inventory database and control the release of the promotions through the distribution server.

In other known system, such as in Joseph and the systems described in US Pat. Pub. No. 2010/0030578 (Siddique et al.) and US Pat. Pub. No. 2007/0028172 (Greer), users could work with a centralized coordinator to edit their multimedia materials and upload the completed multimedia promotion to a distribution server. However, the centralized coordinator still works on a multimedia editor that is apart from the recording system and also apart from the distribution server. Therefore, there is no way that the users can collaborate with each other or even with the centralized coordinator using a single multimedia dashboard application that controls recording multimedia segments, editing the multimedia segments and producing the multimedia promotions, and distributing the multimedia promotions for an end-to-end solution. In prior art systems, it is not possible for one user to record multimedia segments with the dashboard application and upload the segments to an inventory database for another user to edit into a multimedia promotion with the same dashboard application or control the distribution with the dashboard application. Additionally, according to the teachings of the prior art, once a finalized multimedia promotion is uploaded to a distribution server, the various multimedia segments are not available to the users for editing the multimedia promotion with their own customized multimedia segments, such as unique intro or outro videos, different soundtracks, and personalized voiceovers. In the prior art systems, the central coordinator would have to use the separate multimedia editor apart from the management of the distribution server to make the customized edits and then upload each one of the final customized multimedia promotions to the distribution server for the respective users. Thus, there is a need for system integration or connectivity between systems that coordinates the separate tasks of recording multimedia segments, editing the segments into multimedia promotions, and distributing the multimedia promotions within an end-to-end solution.

According to the general teaching in the multimedia sales promotion industry, prior to the present invention, a camera or other recording device would be used to record the multimedia segments which would then be uploaded to a computer system for editing by a multimedia editor to create the multimedia marketing materials but that does not provide a user with control of multimedia recording for new multimedia segments. The multimedia marketing materials would then be transferred to a different computer system for storage and may also be used as the distribution server with its own controlling software program, but neither the multimedia recording system software nor the multimedia editor system software would have any control or access into the distribution server. Therefore, if a user wanted to create a customized multimedia promotion with a unique intro and outro, the multimedia segments would need to be created with the recording system, and the editing would have to be performed using the multimedia editor, and then the final customized promotion could be uploaded to the distribution server. Similarly, if other users in a sales force wanted their own customized multimedia promotions, the separate recording systems and editor would need to be used to produce the promotions.

The necessary use of separate systems for the recording, editing, and distribution of multimedia promotions according to the previously known systems results in significant expenditures of time and expenses to make even a single multimedia promotion. The additional time and costs for customized promotions with unique intros and outros for all of the members of a sales force makes it prohibitive to use current system to produce customized promotions. Accordingly, there remains a need to provide some type of integration of and/or connectivity between these recording, editing, and distribution systems to permit a more efficient end-to-end solution for the production and distribution of multimedia sales promotions. There also remains a need for a system in which customized multimedia promotions can be produced more efficiently, shorter time and lower cost, than in current systems. Finally, it would be beneficial if the end-to-end solution simplifies the tasks necessary to create and produce the multimedia promotions.

SUMMARY OF THE INVENTION

A system and method for creating and managing multimedia sales promotions having a multimedia dashboard that is operated through a mobile computing device that is in networked communication with an inventory database for a particular retailer and is in operative communication with a distribution server. In the preferred embodiment, the computing device is a handheld smartphone or tablet computer capable of operating the fully integrated multimedia sales promotion system which allows capturing images, video and audio for use in a multimedia sales promotion. The computing device has an interactive display that allows a user to select the multiple features displayed on the multimedia dashboard including video recording, photography, photo and video editing, adding music and voiceover to the created multimedia content, an inventory selector in communication with the inventory database operated and/or used by the particular retailer and a promotion controller in communication with the distribution server to deliver the multimedia promotions.

The inventory database saves information in memory storage on items that are intended to be sold by the retailer. The saved information may include data, photos, videos, audios, and other multimedia segments and sales information about the inventory, such as multimedia sales promotions. In operation, the multimedia dashboard communicates with the inventory database through a communications network which permits access to the saved inventory information. Additionally, the multimedia dashboard application can access the storage memory of the computing device which is running the dashboard application and which may locally store the data, photos, videos or other sales information used in creating the multimedia sales promotion. Accordingly, the user can access the sales data and upload it to the multimedia dashboard to be displayed thereon and manipulated by the user through the user interface.

The multimedia system can also upload information to the inventory database, such as replacement date or new additional data pertaining to a particular product. For example, a car dealership may have an outdated photo of a vehicle offered for sale in their inventory database. Accordingly, a user can operated the multimedia dashboard to take a new photograph or video of the vehicle using the computing device's camera and subsequently upload and replace the old photograph or video on the inventory database through the multimedia system. Additionally, newly created or edited multimedia sales promotion videos created using the multimedia dashboard can also be uploaded and saved on the inventory database for later use.

The multimedia dashboard accesses photos and videos in the inventory database or memory which are automatically arranged by the system and can be edited by the user through the interactive user interface within the multimedia dashboard. The user can edit and format the data into a custom multimedia promotion within the multimedia dashboard. Accordingly, the system also has a computer processor and memory unit for processing and storing input data that is either obtained from the inventory database or is obtained through the camera or other input device, such as a microphone which is used for voiceovers.

In another aspect of the multimedia system, the system allows a user to convert the individual photos and videos into a custom multimedia promotion which may include videos, audio, photos and item details such as specifications and text descriptions. The custom promotions are created within the system and are uploaded to outside platforms that may include social media sites or similar platforms accessible by a third party. These multi or single media promotions are created and edited in the multimedia editor which is part of the multimedia systems and controlled by the computer processor of the computing devices. For example, a user may create a custom promotions video that includes a preset introduction to a product followed by the body of the video showing the product compiled from inputted photos, video and/or other data which concludes with a standardized outro. Accordingly, the user can create a unique body portion and automatically format the custom body into a completed promotions video.

In operation, the custom video or other automatically formatted multimedia promotion can be two-dimensional images as well as three-dimensional images presented in a "View 360" feature which projects a 360° display on the dashboard. The 360° display allows the user to interactively view the product where the body is created from multiple videos, video frames or still photographs which are formatted into a matrix that offers a 360° view of the item. For example, a car dealership may create a promotions video that offers an interactive 360° view of a vehicle that is for sale. Additionally, the View 360 feature may also be combined with one or more "hotspots" on which a user may click to bring up particular photographs, detailed videos or other information that may be useful to a buyer as well as allowing the user to move between the various views of the 360° display.

Another aspect of the present invention includes an innovative method for recording, editing/producing, and distributing a multimedia promotion as a digital brochure which includes a brochure generator that creates the digital brochure relating to an item in the inventory database. Creating the brochure includes retrieving a collection photos and videos relating to an item from an inventory database via software executing on the computing device, editing the photos via the software executing on the computing device, recording a voiceover track for a video in the collection, adding the voiceover track to the video via software executing on a the computing device, generating the digital brochure using the photos and videos via software executing on a computing device, and distributing the digital brochure to a retailer website, third-party marketing services, individuals, and social media portals.

The innovative method may also include downloading, adding and editing individual photos for use in a collection related to an individual item in the inventory database. Conversely, a user may delete some photos and videos within the collection during editing and replace the deleted multimedia with new multimedia. Additionally, the method may further include sorting the collection of multimedia into a sales promotion and displaying at least one item from the inventory database.

This system presents sellers with the ability to customize their media marketing in-house, eliminating the need to outsource this process. It also allows retailers to generate more immersive and custom-tailored promotional materials that more effectively entice potential buyers. Furthermore, this system tracks the changes that multiple users make to the promotional materials, increasing the pool of creative input and improving the organization of the system and enables easier division of labor, as one user can shoot video and photos, while user edits the videos and photos to finalize the multimedia sales promotional. The system can also be used to create how-to information and tutorials due to its simple yet powerful editing and production features. The system enables retailers to easily perform post-editing of media segments in a controlled environment such as a quiet office. The system can also communicate service information directly to customers having maintenance or other service performed, such as with vehicles being serviced.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 4A and 4B are screenshots of the multimedia dashboard View 360 help screen and sequence selection screen, respectively.

FIGS. 5A and 5B are screenshots of the multimedia dashboard View 360 two sequence video prompt screens.

FIGS. 8A, 8B, 8C and 8D are screenshots of the multimedia dashboard silhouette prompts, arrangement and publishing screens.

FIGS. 9A, 9B and 9C are screenshots of the multimedia dashboard audio creation prompt screen, video selection screen and voiceover recording screen, respectively.

DETAILED DESCRIPTION OF THE PREFERRED EMBODIMENTS

The following description of the preferred embodiment(s) is merely exemplary in nature and is in no way intended to limit the invention, its application, or uses.

A system 10a for creating and managing multimedia sales promotions 10b having a computing device that is in communication with an inventory database. The inventory database stores data corresponding with items being sold by a retailer that may include photos and videos of the items as well other information that may be relevant to a consumer. The computing device is in networked communication with the inventory database which permits bidirectional access between the database and computing device wherein data can be both downloaded from as well as uploaded to the database from the computing device. Preferably, the present invention also includes a distribution server that publishes the multimedia sales promotions on web portals, sends the promotions to third parties, or otherwise makes the promotions available such as by communicating links to websites hosting the promotions. The inventory database may be hosted on the distribution server or may be in networked communication with the distribution server. The present invention is particularly disclosed with reference to the sale of vehicles through a car dealership, and it will be evident that the innovative aspects of the present invention can be used in any type of sales environment for any type of product, such as retail sales through a retail website and individual sales through one or more online shopping bazaars, such as E-bay, cars.com, Autotrader, Amazon, craigslist, Etsy, Google Shopping, Facebook Marketplace, Overstock, Zappos, Alibaba, and the like.

Figures 1A, 1B:
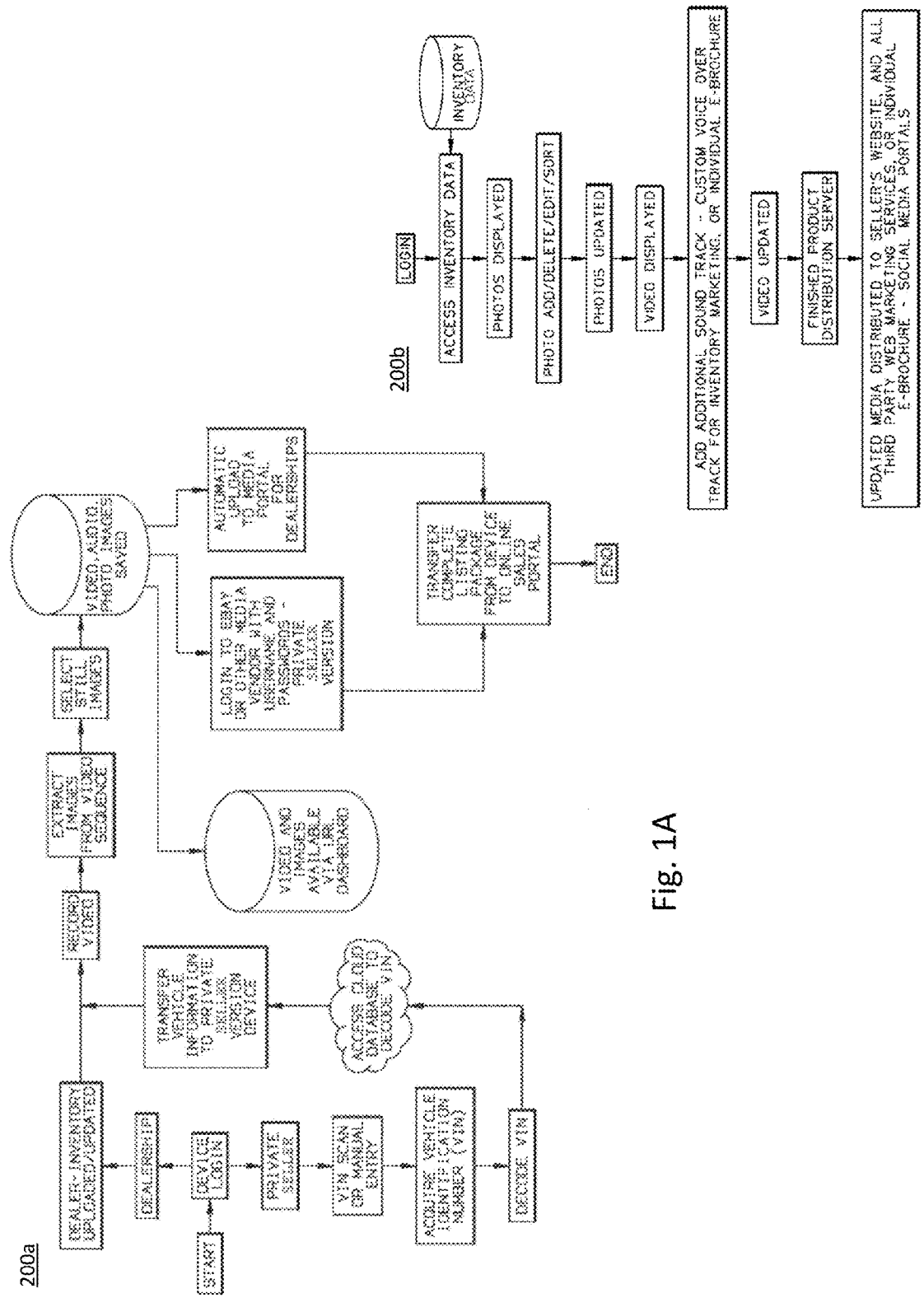
FIGS. 1A, 1B and 1C are flowcharts of the present invention's methods.
Figure 1C:
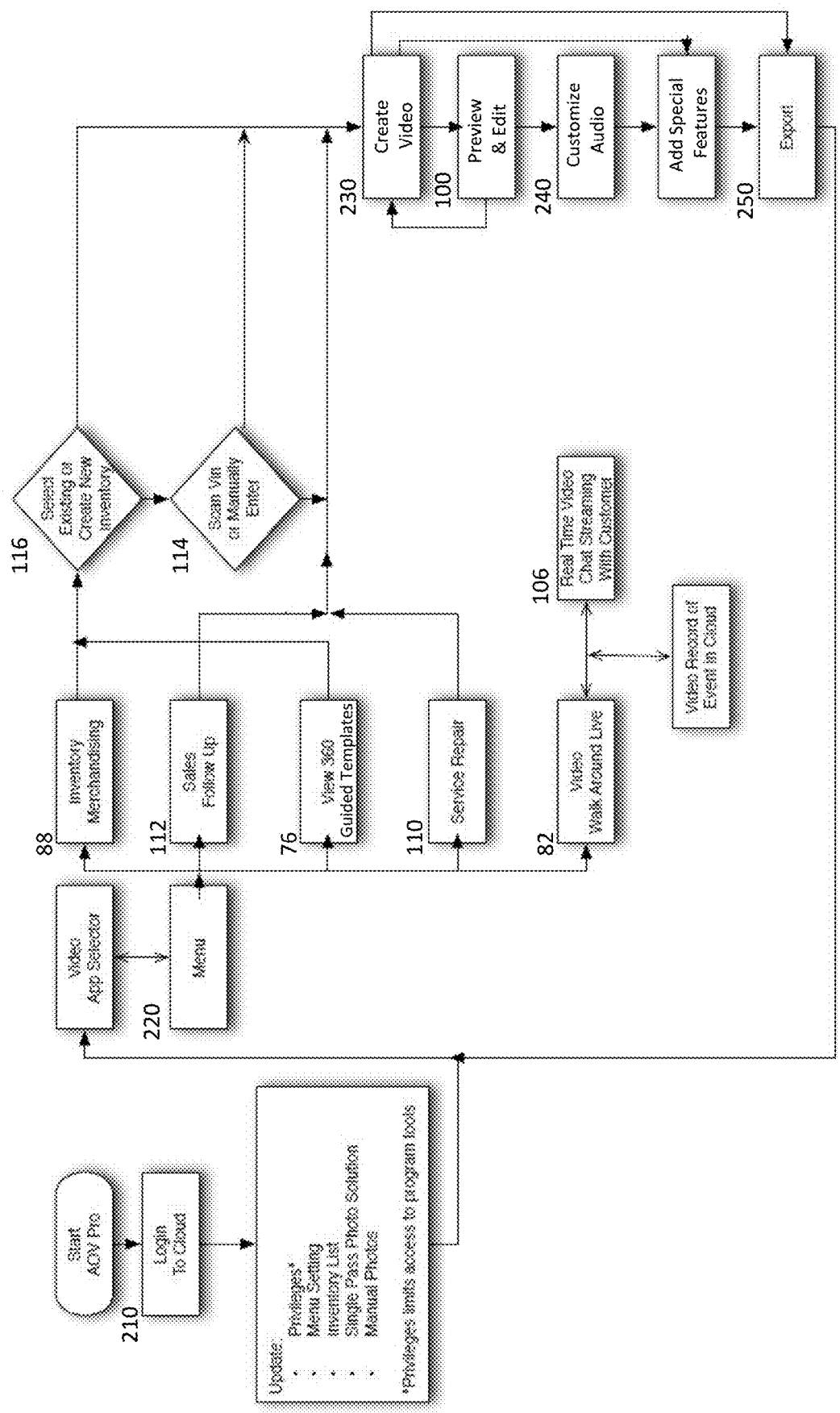
Figure 2:
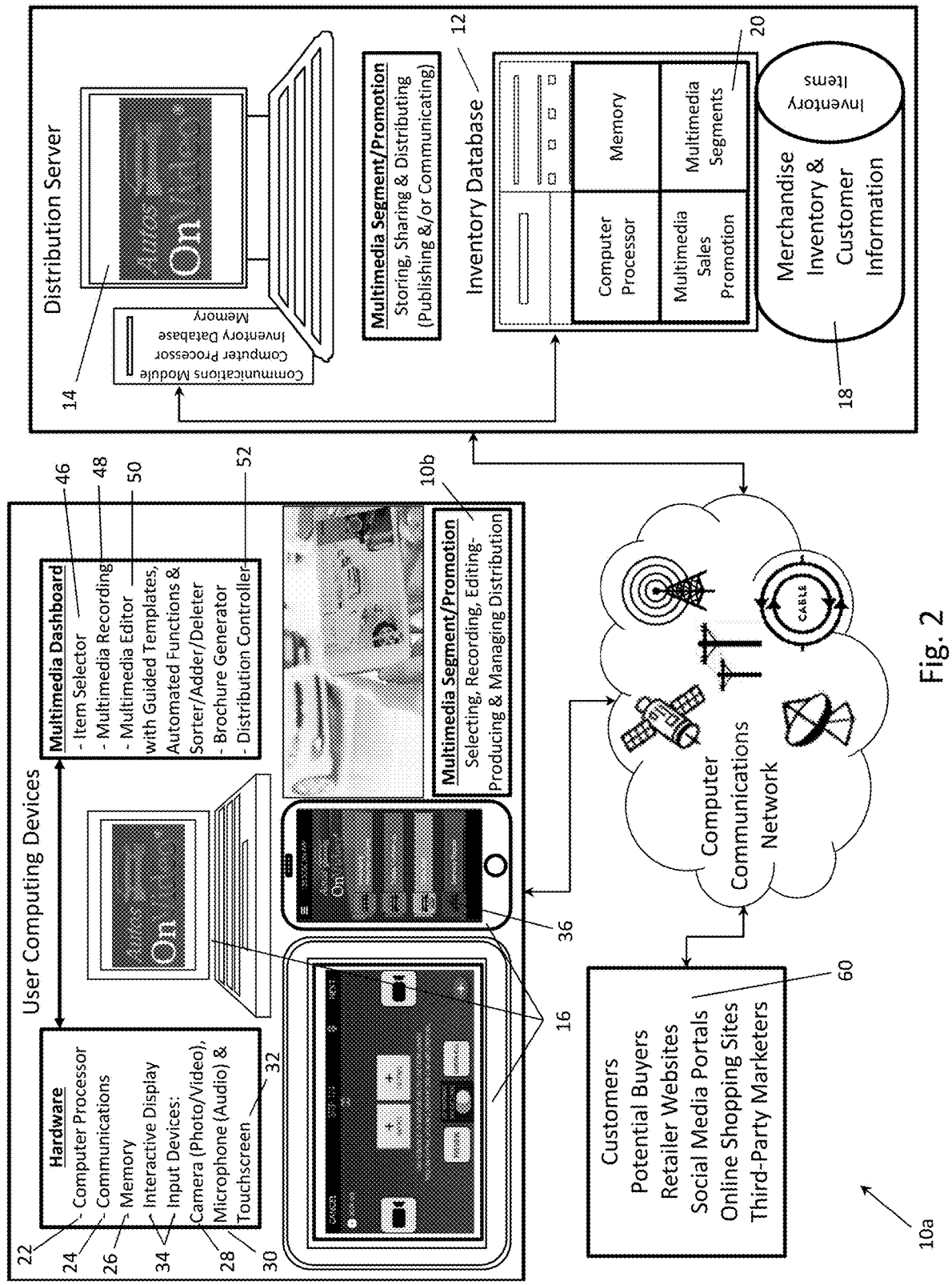
FIG. 2 is a schematic diagram of the present invention's system.

Generally, the system 10a described herein allows for the creation of multimedia segments, the production and management of multimedia sales promotions 10b using the multimedia segments, and the uploading and distribution of the multimedia sales segments 20 and promotions related to an item in order to better market that item on a web-based media portal, all of which is controlled through a multimedia dashboard application that preferably operates on a handheld computing device. The general process 200 of the system 10a elements are illustrated in the flowcharts of FIGS. 1A-1C and are described in detail below. A schematic diagram of the general system is shown in FIG. 2, and particular innovative features of the system are described below with reference to FIGS. 3-10. As shown in FIG. 2, the system includes the inventory database 12, the distribution server 14, one or more user computing devices 16, and the multimedia dashboard application 36 operating on at least one of the computing devices that is in communication with the inventory database and the distribution server. The multimedia promotions are published on a web-based media portal 60, such as retailer's website 60a, online shopping bazaars 60b, third-party marketing services 60d, and/or social media portals 60c or are otherwise communicated to customers or potential buyers 60e.

The multimedia dashboard application includes an item selector 46, multimedia recording modules 48, multimedia editors 50, a brochure generator, and a distribution controller 52. With these features, the same multimedia dashboard application is used to record multimedia segments 20, select segments 56a to be uploaded to and downloaded from the inventory database, edit segments 54 to produce multimedia promotions, and control the distribution of the promotions, thereby providing users with a simplified and integrated system and process to market their goods. The multimedia dashboard application interacts with the input devices on the user computing device, including the camera 28, the microphone 30, and the interactive touchscreen 34 display 32 which allows the user to enter product information, record video of the product, extract still photos from the video and perform other editing functions to produce multimedia segments and the multimedia sales promotions, to upload the product information, the multimedia segments, and the multimedia promotions to the inventory database, and to control the distribution server.

The inventory database and distribution server make the multimedia sales promotions available to one or more web-based media portals that can be accessed by and displayed to a third-party consumer. The system can also allow for the direct delivery of multimedia sales promotions or links to the promotions to individual customers through any type of electronic channel of communication, such as by email, text messaging (SMS messaging), or MMS messaging. Accordingly, as explained herein, the system simplifies the ability to market a product with multimedia (i.e. video 40, photo 38, and audio 42 media) directly to customers or through web portals, such as a retailer's website, online shopping bazaars, social media sites, or web marketing sites, where the user can take video, record audio, and extract photos to upload or otherwise distribute the multimedia sales promotion to one or more web portals with a single computing device with one multimedia dashboard application. Additionally, the user can customize these multimedia sales promotions within the multimedia dashboard application.

The inventory database contains a set of inventory items in the sales inventory 18 for a retailer or other seller. For example, the inventory database for a car dealership includes data for the vehicles in the dealership's sales inventory. Although the data associated with each item may vary, the inventory database of the multimedia creation and management system described herein includes one or more multimedia segments, such as video or photos of the item, and a multimedia sales promotion if a user had previously created a multimedia sales promotion and saved it to the inventory database. Multimedia refers to audio-visual media which may include photos, videos, graphics, voiceovers, music, or other images and sounds which are saved in the inventory database as individual multimedia segments. In operation, these multimedia segments are accessed by the computing device and arranged, edited, and formatted by the multimedia dashboard supported on the computing device to create complete multimedia sales promotions.

Many of the same features in the multimedia dashboard application that are used to create the multimedia sales promotions can also be used to produce multimedia service reports on vehicles that are being repaired or otherwise serviced. For example, when a vehicle is brought in for service, the user in the service department can take pictures or a video of the vehicle that show the service that is necessary. The inventory database can include contact information for the customers who own the vehicles being serviced, and the dashboard application and/or distribution server can send electronic message to the owner with the multimedia service report or a link to the report. The owner can respond back to the service department through the electronic communication or by placing a call. As with the multimedia sales promotions, the multimedia dashboard application can be used to produce multimedia service reports 110 for different types of products in addition to vehicles.

The computing device is preferably a handheld device, such as a mobile smartphone or tablet computer, and the multimedia dashboard is a mobile application running on the device's computer processor. It will be appreciated that users can run the multimedia dashboard application on other computing devices, such as laptop computers and even desktop computers, tower computers, and in cloud computing environments. Regardless of the particular computing device being operated by the user, the user's computing device is in networked communication with the inventory database and the distribution server and includes a camera, a microphone, a data input device, a user interface 34, a memory module, a communication module, a computer processor 22, and a display screen 32. The computer processor controls the other modules on the computing device and the user interface allows the user to view and select the described modules and applications. Preferably, the display screen is an interactive display with touchscreen functionality that serves as the primary user interface for the application.

The multimedia dashboard application allows the user to create a multimedia sales promotion that is ultimately published on a retailer's website, online shopping bazaars, third-party marketing services, and/or social media portals or are otherwise communicated to customers or potential buyers. The user operates the multimedia dashboard through the user interface, entering inputs 44 through the user interface to download preexisting multimedia segments from the inventory database, control the camera to take new photos and videos, and control the microphone to record audio voiceovers 68. For computing devices that have a touchscreen, the user can enter information through a touchscreen keypad or can otherwise select items presented on the display. It will be appreciated that the computing device may have other user interfaces, such as a speech to text data entry mode of operation as well as a physical keyboard or mouse or any other peripheral device that is operable with the computing device through a wired or wireless communication connection.

To create the multimedia sales promotion, the user operates the media editor on the multimedia dashboard to customize the multimedia segments associated with the items in the inventory database. The multimedia editor is made up of a video editor, photo editor and sound editor that the user interacts with through the user interface. In operation, the communications module 24 downloads the multimedia segments and the multimedia sales promotion, if one has been previously created, from the inventory database through the item selector. The user computing device has an operable communication link to the inventory database that allows the user to select a particular item from the inventory that will be the subject of the multimedia sales promotion. Although not intended to be limiting, the user may enter in the SKU, VIN number, stock number, name or other identification code related to the particular item and subsequently select that item within the inventory database.

Once the existing multimedia segments are downloaded to the user computing device, the user can operate the multimedia dashboard application to format, edit and customize the segments into customized multimedia portions associated with the item. For example, a user can take multiple still shots of the front of a vehicle and combine them with other still shots of the rear of the vehicle and combine them into a customized portion. Customized portions can be further edited and combined to create the completed multimedia sales promotion.

In addition to accessing the inventory database to retrieve preexisting multimedia segments for use in creating the promotional multimedia, the multimedia dashboard application running on the computing device operates the camera and microphone to record new photos, videos and audio. As with the segments retrieved from the inventory database, these new multimedia segments 56*b* can also be edited and arranged into custom portions and may be combined with or completely replace the preexisting segments previously saved in the inventory database. For example, if a user downloads a preexisting photo segment but determines the photo is outdated, the user may use the camera through the multimedia dashboard application to capture a new photo that can be used in the multimedia promotion. Accordingly, the user can save the new photo both to the database and within the memory module 26 of the computing device while in the multimedia dashboard, without having to leave the multimedia dashboard application.

As indicated above, the system is described according to its use in selling vehicles, but the present invention is not limited to selling cars and may be used for selling a wide variety of products. In certain embodiments, the present invention may begin with either a private seller or a dealer logging into the software through the user interface of the computing device. The dealer may upload or update their inventory in the inventory database. When selling a car, the private seller may scan a Vehicle Identification Number (VIN) or manually enter the VIN into the program. The program may acquire the VIN number, and decode the VIN by accessing a cloud database for decoding. The information of the car may thereby be transferred back to the private seller's computing device from the inventory database. Once the proper item has been identified either from a dealer or private individual, the multidimensional sales promotion may be created within the multimedia dashboard software application based on the preexisting data in the inventory database and any new multimedia segments that the user creates and uploads using the multimedia dashboard.

FIGS. 1A, 1B, and 1C show flow charts of the system according to various embodiments of the present invention. FIG. 1A 200*a* is an embodiment of the system being used by multiple members of a sales staff as well as with private individuals and small retailers. FIG. 1B 200*b* illustrates how the system can be used with web portals or direct communications with potential customers. FIG. 1C 200*c* shows another embodiment with multiple modules within the dashboard application. In the preferred embodiment, a member of the sales staff or the service team for a car dealership logs into the system 210 through the multimedia dashboard application as an authorized user. The authorized user is given access to the inventory merchandise 88 data and/or customer information from the inventory database that corresponds to the user's credentials. The system retrieves photos of items in sales inventory and shows the photos to the user on the display of the computing device that runs the multimedia dashboard application. The user can operate the dashboard application to add, edit, delete, or sort the multimedia as explained herein and update the multimedia saved within the inventory database based on the user changes.

For dealerships that have purchased multiple dashboard modules, the user selects the module of interest from the opening menu 220. For example, the user can choose to manage inventory merchandising 88, follow up with a potential customer 112, produce a multimedia product presentation for an item using a guided template 76, coordinate product repair and other service tasks with individual customers, or create a video livestream for an item. Once the dashboard selection is made, the user can select an existing item from the inventory database by entering in VIN number, stock number 116 or other identifier or can enter in a new item 114 that is not previously saved in the inventory database. Most of the dashboard modules include all of the integrated features of the multimedia dashboard application to create 230, edit 100, customize 240, and export 250 the multimedia materials as described above and according to the particular processes described herein.

In one aspect of the inventive system, the multimedia dashboard application uses a video 62 to create a custom multimedia body portion. Within the multimedia dashboard application, the video can be edited to include photos, music, voiceovers, and other custom audio. In another aspect of the inventive system, the multimedia dashboard application is used to bookend an intro portion 64 and/or an outro portion 66. The multimedia dashboard application can also be used to preview 100 and reedit the multimedia segments and export the completed multimedia sales promotion to the camera roll, inventory database and/or distribution server. Due to the nature of livestreaming interactive multimedia, the livestreaming module 82 preferably bypasses the editing and customization functions to proceed from the recording function immediately to the distribution function according to the livestream functionality as described below.

The multimedia dashboard preferably includes guided templates that automatically generate predefined product views. For example, as described with reference to FIGS. 3C-3E users can produce customized multimedia promotions by recording their own intro and an outro multimedia segments that can be combined with a body segment, and they can also record their own voiceovers for one or more of the segments and select the background music. The multimedia dashboard application includes an intro-outro guide feature that users can follow to record the intro segment and the outro segment and add the segments to a body segment to produce a customized multimedia promotion. As another example, as described below with reference to FIGS. 4-7, a user can use the View 360 feature to take a video around the exterior perimeter of the product and either the user or the system selects image frames from the video to automatically create a rotatable 360° view of the product's exterior. Additionally, silhouette images 102 guide users on the photographs to take and the order of publication of product features as described below with reference to FIG. 8, and users are also provided with audio guides as described below with reference to FIG. 9.

In addition to the templates and automated functionality summarized above, the View 360 feature also provides users with a hotspot overlay 78 function that provides still frame templates 80 with the descriptive names of product features and exemplary silhouette images that guide the user to take pictures of the particular features. When the user selects particular photos for corresponding hotspot locations on the product, the View 360 feature automatically tags 104 these product features with representative icons or graphical symbols for the features on the corresponding views in the pictures that form the rotatable 360° view and also links the particular pictures of these product features to the tagged icons so that when a potential customer selects the icon, the picture of the corresponding product feature is displayed. It will be appreciated that providing guide features and automating functions in producing and distributing the multimedia promotions simplifies the overall operation of the system so that members of the sales staff or support staff of a car dealership can create and manage their own multimedia promotions without having to hire specialists in videography, photography, editing, and post-production distribution.

The schematic diagram of the inventive system is shown in FIG. 2, including the inventory database, the distribution server and examples of remotely operated user computing devices. The computing device has a display screen that presents the user with an interface to view the multimedia dashboard application. Preferably, the display screen is interactive with touchscreen functionality that can receive inputs from the user. In the preferred embodiment, the multimedia dashboard application is downloaded to the user computing device and is resident in its memory and runs on its processor. In other embodiments, the multimedia dashboard application is hosted and runs within a cloud computing environment and is accessed by the user computing device through a web browser application that is directed to a website with a particular URL that can permit access to the web-based software. As a resident software application, the multimedia dashboard can access the media segments that are saved to the computing device's memory storage or that are available through networked communications with the inventory database. As a hosted software application, the multimedia dashboard preferably accesses the media segments through the cloud computing environment, such as through URL identifiers which specifies particular segments in the inventory database. It will be appreciated that in a cloud computing environment, the URL identifiers for the media segments in the inventory database do not necessarily need to be the same as the website URL associated with the software. For a private seller, the user may login to an online shopping bazaar and transfer the complete listing package from the device to the online sales portal. For a dealer, the video, audio and images may be automatically uploaded to a media portal for the dealer, which transfers the complete multimedia sales promotion listing package from the multimedia dashboard to the online sales portal.

As indicated above, the same multimedia dashboard application is used to record multimedia segments, select segments to be uploaded to and downloaded from the inventory database, edit segments to produce multimedia promotions, and control the distribution of the promotions. This fully integrated dashboard application, such as the Autos On Video® software suite, provides users with an end-to-end solution for creating, managing, and distributing multimedia promotions. Users can shoot video with the multimedia dashboard application that is loaded on the computing device or that is accessed on a hosted platform through a web browser. Accordingly, the user may record video and capture still images within the dashboard application, either directly or by extraction from video, and also use the dashboard application's media editor to produce the multimedia sales promotion. The user can upload and download multimedia segments and multimedia sales promotions between the computing device and the inventory database and can select one or multiple web portals or individuals to which the distribution server sends the multimedia promotions.

The media editor includes a photo editor, a video editor, and an audio editor that edits photos, videos, and audios based on user inputs. The photo editor allows the user to edit a collection of photos for an item in the inventory database or to edit new photos captured by the camera and saved locally on the computing device. The media editor can sort 70 media segments in a collection, add media segments to the collection, delete media segments from the collection, or edit individual media segments based on the user inputs and whether automatic editing is enabled by the user, for example when they do not wish to manually edit a media segment. The photo editor may involve cropping, altering the exposure, altering the balance, adding a marque or making other changes and can be done on the user interface where a photo icon and a sorting icon are displayed. Similarly, the video editor can modify videos based on user inputs such as cropping, adding a marque, adding wipes, adding or deleting footage, adding written captions, etc. The audio editor can add audio recordings to a video, such as voiceovers 68 and/or background music 74, or can silence the video or use the ambient sound that had been recorded with contemporaneously with the video. Generally, the media editor allows the user to create the multimedia promotion, such as a guided video tour of a product, a customized video of a product with unique intro and outro, a sequence of photos for a product, a rotatable 360° view of a product, and hotspot overlays for particular product features.

As shown in FIG. 3, the user operates the camera and the microphone through the user interface on the multimedia dashboard to record the multimedia segments and operates the editing module to perform a series of steps that create a complete multimedia sales promotion. As shown in FIG. 3A, a particular user can log into the multimedia system with their unique ID or a new user ID can be created for a group of users that share the same inventory database for their multimedia sales promotions and may even share the same tablet computer to record videos and take pictures, such as may occur in a car dealership with several sales staff. As shown in FIG. 3B, the user selects 44a the action to be taken for a particular product, such as creating new photos or video, using or editing existing videos or photos saved on the computing device or within the inventory system, or editing detail information about the product. Once the multimedia segments associated with the selected item are downloaded from the inventory database, the user can format the existing multimedia segments into the body portion of the multimedia sales promotion as well as record and add customized intro and an outro video portions as shown in FIG. 3C. Additionally, the user can record audio, such as with voiceovers, or select background music for the video segments, or take new pictures to be used within the multimedia sales promotion. Although the user has the option to manually edit the multimedia sequences, as shown in FIG. 3D, the user may elect to skip the customized formatting of the intro, body and outro portions and move directly to the creation of the promotional materials. FIG. 3E shows an example in which a user has customized a promotional video with an intro video that is by the body of the video showing item details from photos, video and/or other data which concludes with a standardized outro. Accordingly, the user can create a unique body portion and automatically format the custom body into a completed promotions video. Additionally, the user can add unique and stylized transitions like fading and customized audio as explained below.

As indicated above, the multimedia dashboard includes guided templates and automatically generated predefined product views. Automatic creation of predefined views allows the user to skip directly to the arranged photos and video used as the body portion of the promotional multimedia as well as export the completed multimedia sales promotions to the inventory database or third party site. By automating aspects of the creation of the multimedia sales promotion materials, the user can merchandise more items in a shorter amount of time where they do not have to manually edit and format each multimedia segment into a multimedia sales promotion where it is completed for them. Additionally, by providing guided templates within the dashboard application, the system can be operated by sales staff or support staff to produce multimedia promotions without any specialized training in multimedia creation or production.

The "View 360" feature as shown in FIGS. 4-7 uses both guided templates and automatic actions performed by the multimedia dashboard application to create a rotatable 360° view of the product as another option for a multimedia sales promotion. When preparing a View 360 promotion for a vehicle, the dashboard application guides the user in the proper operation of the recording module 90 to capture the interior and/or exterior 360° views of the vehicle either through multiple sequential photographs, sequential videos 94 or a 360° lens which are then saved in the memory of the handheld device. The dashboard application then either automatically selects image 98 frames from the video or guides the user to select the image frames using the 360° multimedia editor 92. In the preferred embodiment, external video segments of a vehicle are captured using the recording module, and the multimedia editor selects the image frames and automatically creates a rotatable 360° view of the vehicle's exterior. The user uploads the 360° view to the inventory database and links the view to the inventory record for the vehicle.

It will be appreciated that it is known to create a rotatable 360° view around the exterior of a vehicle with multiple individual photographs that are either taken from a series of particular vantage points around the vehicle or from a set vantage point while the vehicle is rotated on a large turntable. There are automated processes to combine the pictures together to produce the rotatable view. However, the turntable option is cost prohibitive for most car dealerships, and the "walk around" methodology is challenging to get the proper angles and distance at each particular vantage point so that the perspective of the vehicle is consistent through the sequence of images. When taking individual photos, if some photos in a sequence are taken close to the vehicle while other photos in intermixed within the sequence are taken further away from the vehicle, when the photos are combined into the rotating 360° view, the perspective of the vehicle between the images will change and cause a disjointed rotating view. Current solutions that suggest using a stand-alone application with a single video rather than an integrated end-to-end solution with distribution control and sharing of multimedia promotions series of still photographs; the stand-alone application is less efficient than the integrated solution of the present invention and requires additional time to distribute and share the rotating 360° view, and a single video may result in a single discontinuity between the first extracted image frame at the beginning of the video recording and the last extracted image frame at the end of the video recording.

The present invention avoids the problems of piecing together separate individual photographs and instead uses images taken from a sequence of videos of the vehicle to create the rotatable 360° view of the vehicle's exterior. Using the View 360 feature, a user can take a video around the exterior perimeter of the product, and the system selects image frames from the video to automatically create a rotatable 360° view of the product's exterior. In the preferred embodiment, the dashboard prompts the user to select an optional 2-sequence video or a 4-sequence video as shown in FIG. 4B. Users who select the 2-sequence option are prompted to take a video on each side of the car, as shown in FIGS. 5A and 5B. Users who select the 4-sequence option will be prompted to take four videos on the respective segments of the car as shown in FIGS. 6A-6D. After the videos are taken, the user confirms that the process had been followed for the 360 Video as shown in FIG. 7A, and the system then extracts a sequence of the images from the video and combines the sequential images into the rotating 360° view.

Figures 7A, 7B, 7C:
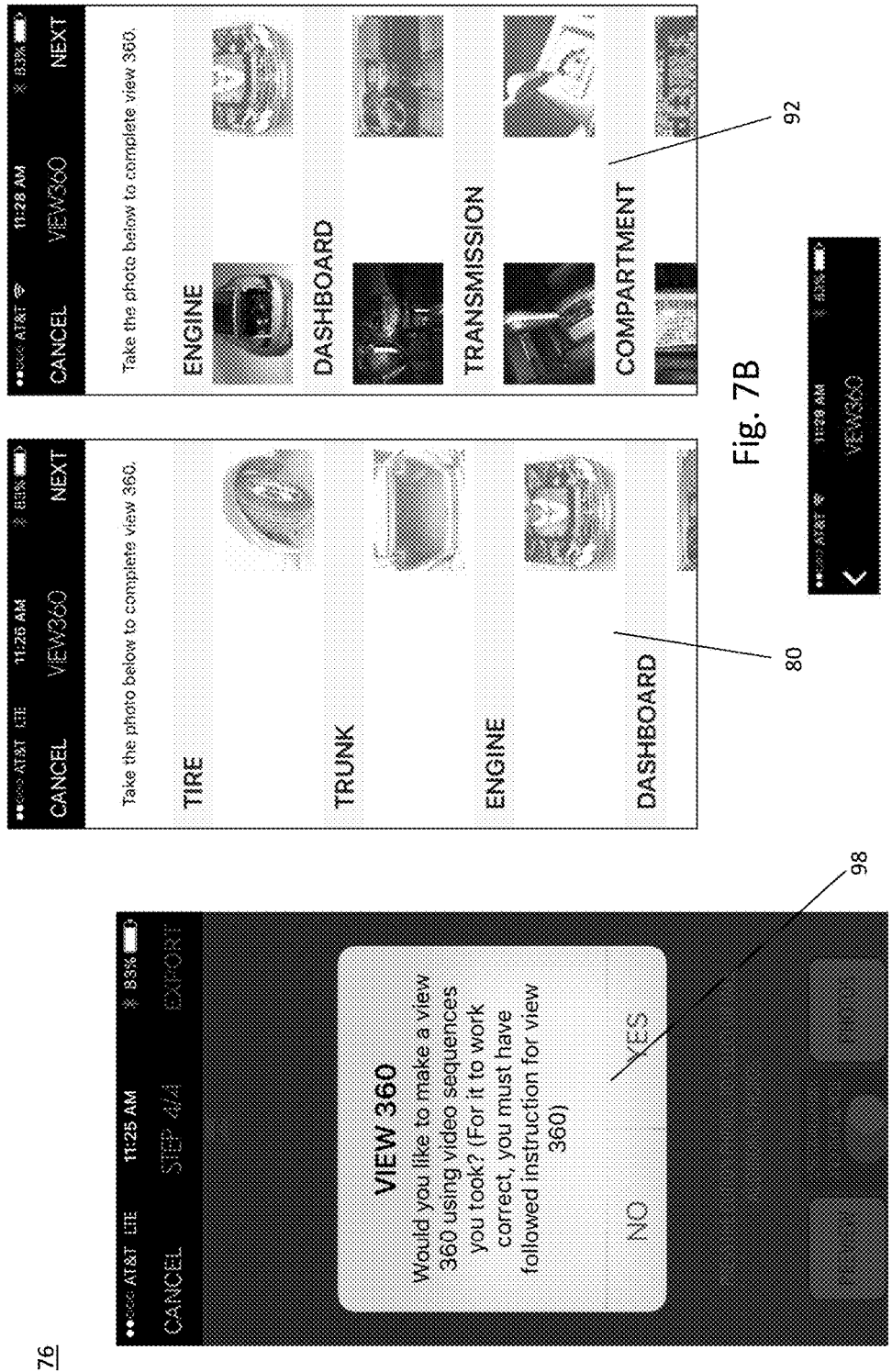
FIGS. 7A, 7B, and 7C are screenshots of the multimedia dashboard View 360 prompt screen, silhouette prompt screen, and camera roll access prompt screen, respectively.
Figure 7D:
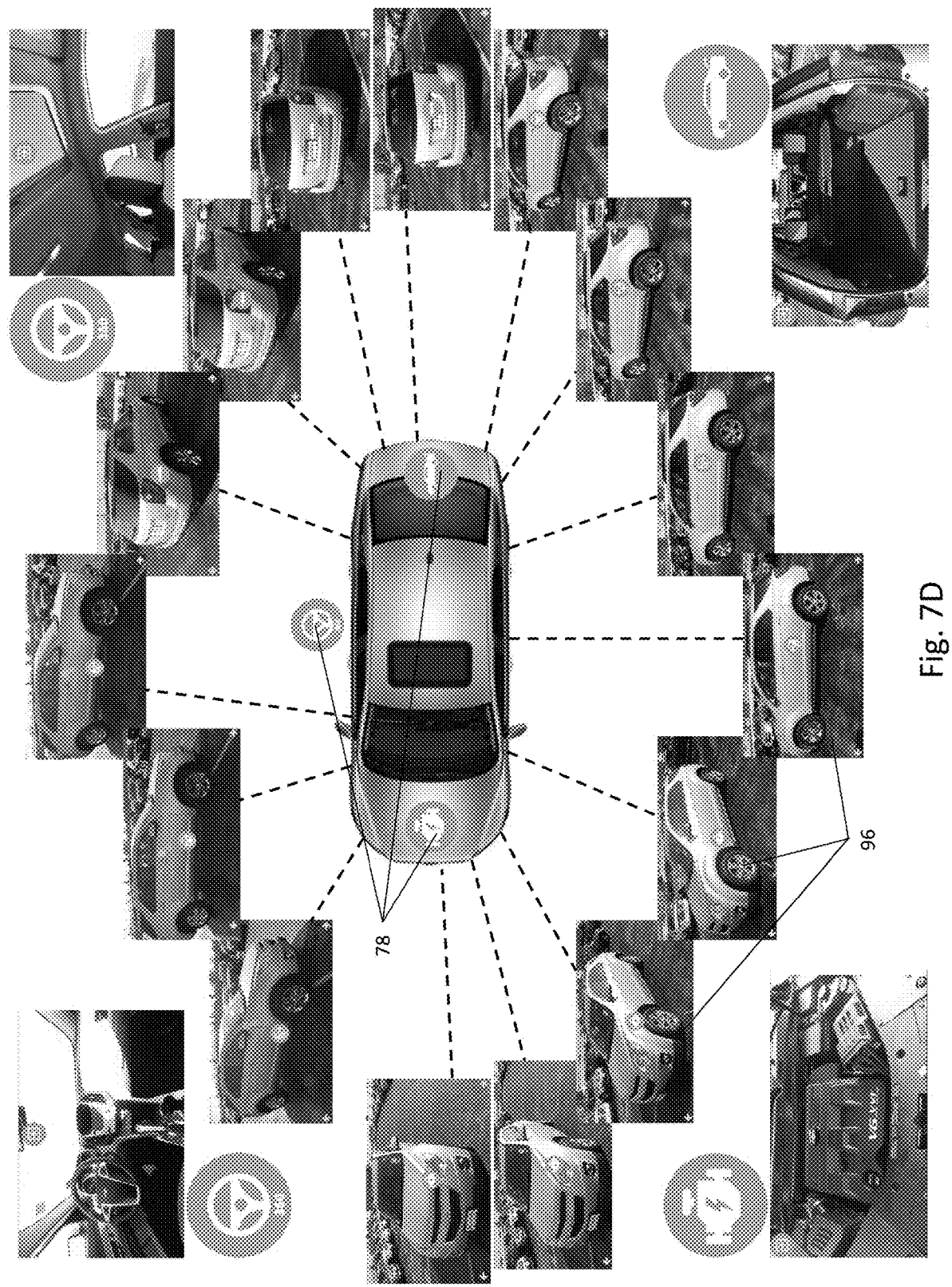
FIG. 7D is a schematic view of image frames selected from video sequences and representative hotspot overlays according to the multimedia dashboard View 360 feature.

As shown in FIGS. 7B and 7C, the multimedia dashboard application also provides the user with a hotspot template guide to create "hotspot" overlays that the system automatically integrates into the multimedia sales promotion. The hotspot template guide includes still frame templates with the descriptive names of product features and exemplary silhouette images that show the user the particular features that should be photographed. For example, as particularly illustrated in FIG. 7B for a vehicle, some of the hotspot views may be the tires, the trunk, the engine, the dashboard instruments, the transmission shifter, and the interior compartment. When the user selects particular photos for corresponding hotspot locations on the product, the View 360 feature automatically tags these product features with representative icons or graphical symbols for the features on the corresponding views in the pictures that form the rotatable 360° view and also links the particular pictures of these product features to the tagged icons so that when a potential customer selects the icon, the picture of the corresponding product feature is displayed. It will be appreciated that providing guide features and automating functions in producing and distributing the multimedia promotions simplifies the overall operation of the system so that members of the sales staff or support staff of a car dealership can create and manage their own multimedia promotions without having to hire specialists in videography, photography, editing, and post-production distribution. As particularly represented by FIG. 7C, a hotspot overlay of the interior compartment 122 can be another rotatable 360° view. In FIG. 7D, a schematic view of the sequence of vehicle images 96 that comprise the rotatable 360° view is shown with hotspot overlays for the engine, trunk, and interior compartment. The hotspots may also be linked to a voiceover recording with information relating to the hotspot.

Figures 8A, 8B:
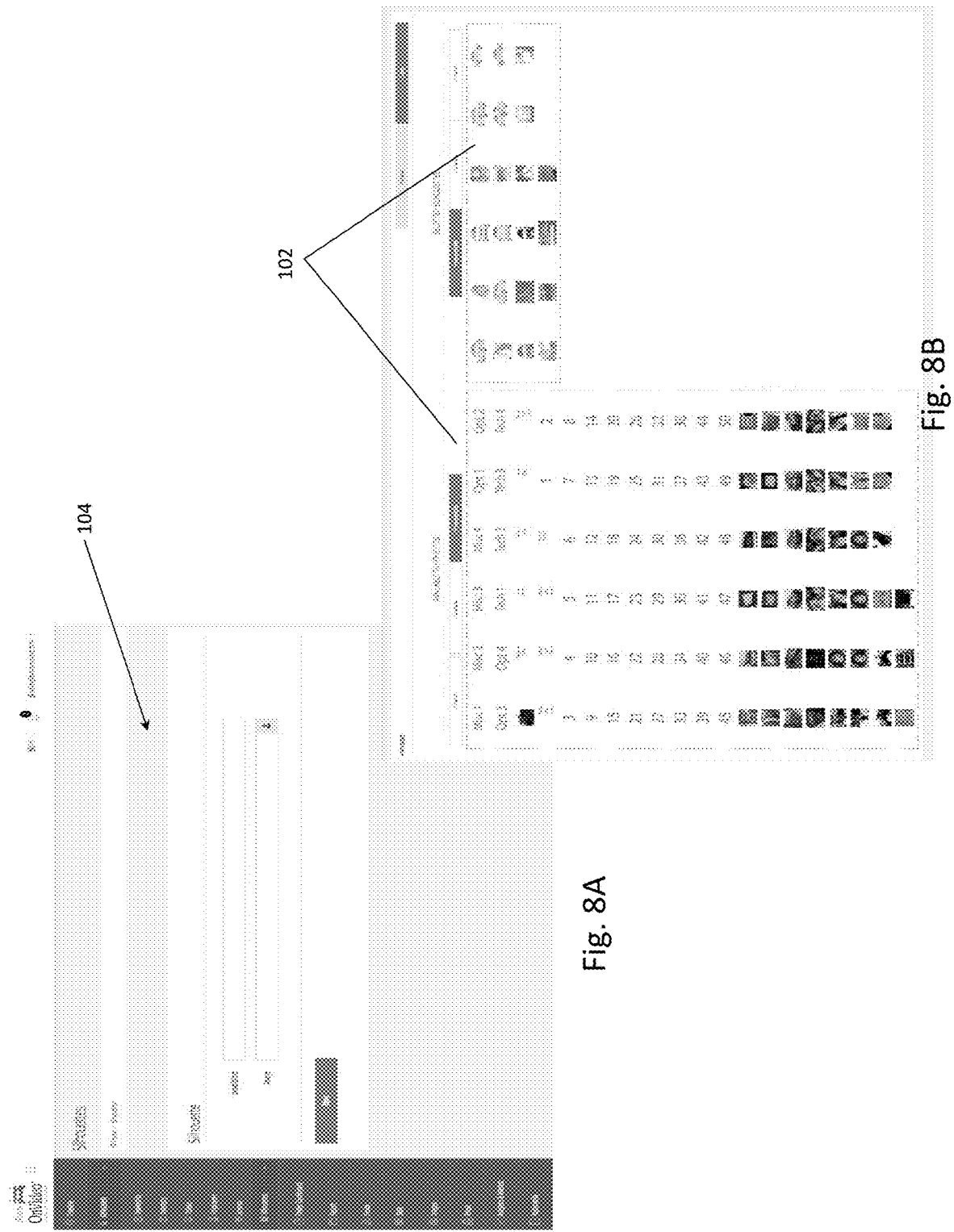

As shown in FIG. 8, the multimedia dashboard application includes a template of silhouette images for various product features that should be photographed for a particular type of product, such as a vehicle. The silhouettes guide the user to record the preferred images for the product features and provides the user a particular order for the features which reduces the time it takes users to produce the multimedia promotion with the sequence of images. The template can be standardized for a particular retailer to provide a uniform presentation of images for the products. FIG. 8A depicts the user prompt for creating silhouette images where the user can enter in a description of the image to be taken for future use. Subsequently, the system queues the entered silhouettes as shown in FIG. 8B where the user can select one or more silhouette images and rearrange the publication order 120 as they see fit as shown in FIGS. 8C and 8D.

In addition to the various photo and video media used in the multimedia sales promotions described herein, the custom multimedia portions may also include custom audio options as indicated in FIG. 9A, including but not limited to a recorded voice message, a selected music, a voice message with music, an original video audio, and a silent audio. After the user has completed formatting the photo and video portions of the multimedia promotion within the photo and video editor, respectively, the user can use the audio editor to record voiceover and blend music tracks to the video media. Although any type of audio may be used, the system is capable of recording a speaker's voice as well as a speaker's voice with music. Additionally, a user may choose to have a silent promotion or a promotion with the original background noise of the video.

Figure 9D:
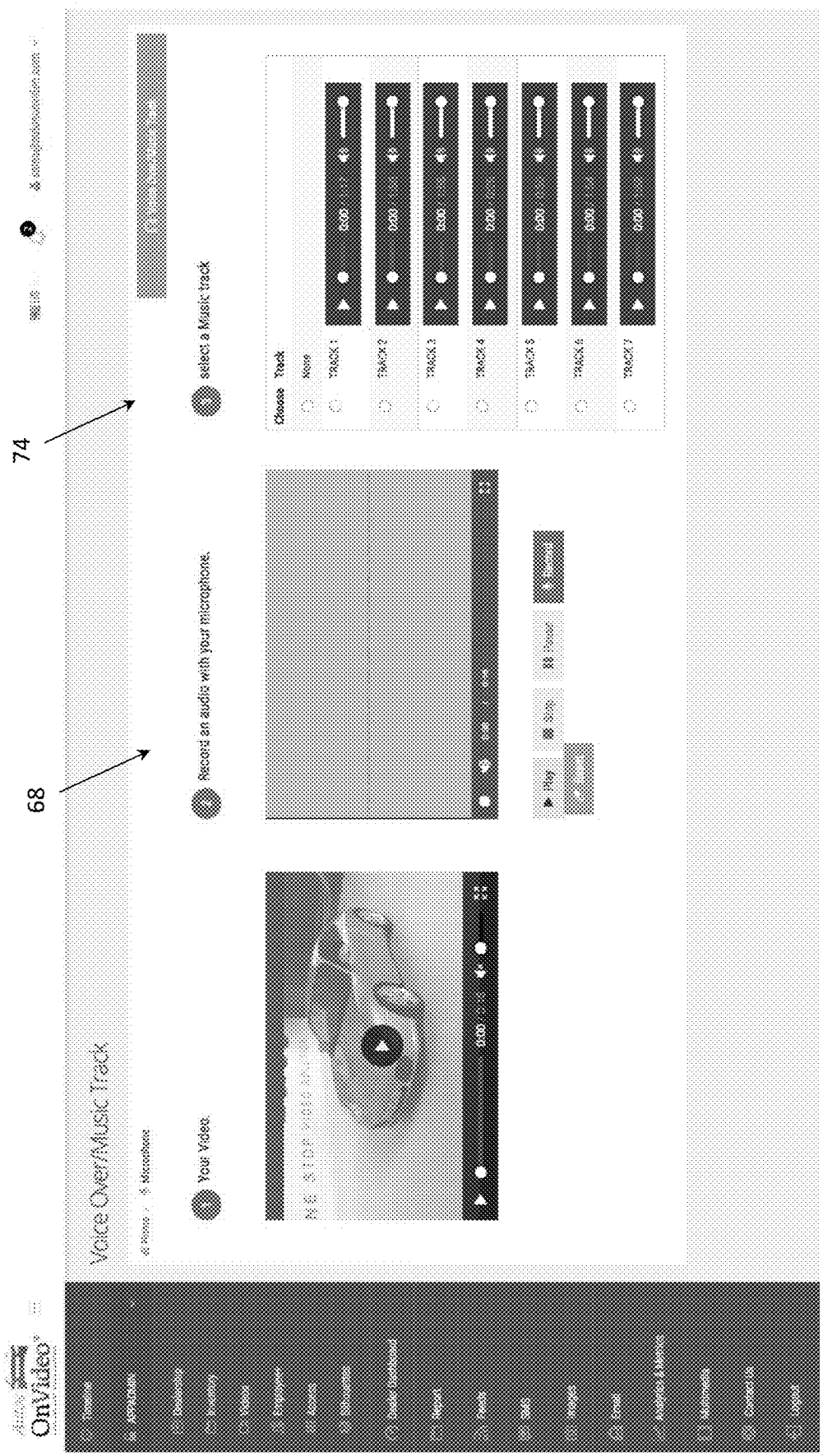
FIG. 9D is a screenshot of the multimedia dashboard audio creation screen.

Once an option is selected, the user is prompted with the screen depicted on FIG. 9B where the user can select which video multimedia promotion they want to edit, such as by recording a voiceover. Subsequently, the user can use the microphone on the computing device to record the voiceover, such as shown in FIGS. 9C and 9D. As shown in FIG. 9C, a voiceover script can be saved to the dashboard application in a script field 84 for a particular product, and the user can record the voiceover as the video is playing in a video field 86 on the same display screen 72 as the script field. It will also be appreciated that a single voiceover can be shared by different users. As shown in FIG. 9D, the dashboard application can also provide the user with one or more music tracks that the user can blend with a voiceover. The dashboard application provides the user with post production options to complete the multimedia promotion, including selecting multimedia production options for a promotion based on product SKU, VIN, Stock Number or other specific product identifiers. The user operates the dashboard application to store the audio to the inventory database.

In another embodiment, the distribution server may also distribute a livestream made up of live video 106 and audio and may also include a live text chat 108 between the user running the multimedia application and one or more potential buyers. In this embodiment, the computing device's camera creates the livestream media while the computing device's communications module supports the live text chat, and the distribution server preferably connects the livestream media from the computing device to an external link that connect the buyers into the livestream and chat. Accordingly, a user can interact with a customer in real time to display products and product information, beyond that held in the inventory database or in premade promotions. Additionally, the livestream may also be recorded by the computing device and saved into its storage memory as well as uploaded to the inventory database by either the computing device or the distribution server.

Figure 3B:
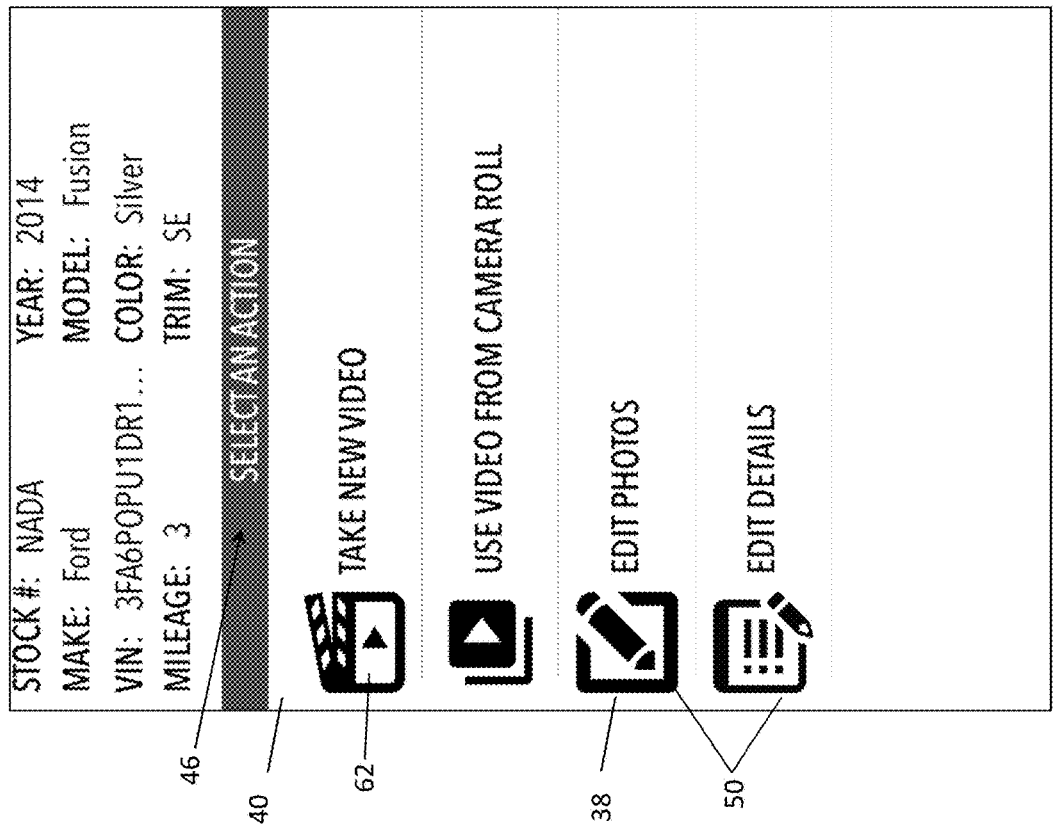
FIGS. 3A and 3B are screenshots of the multimedia dashboard login screen and item selection screen, respectively.
Figure 3A:
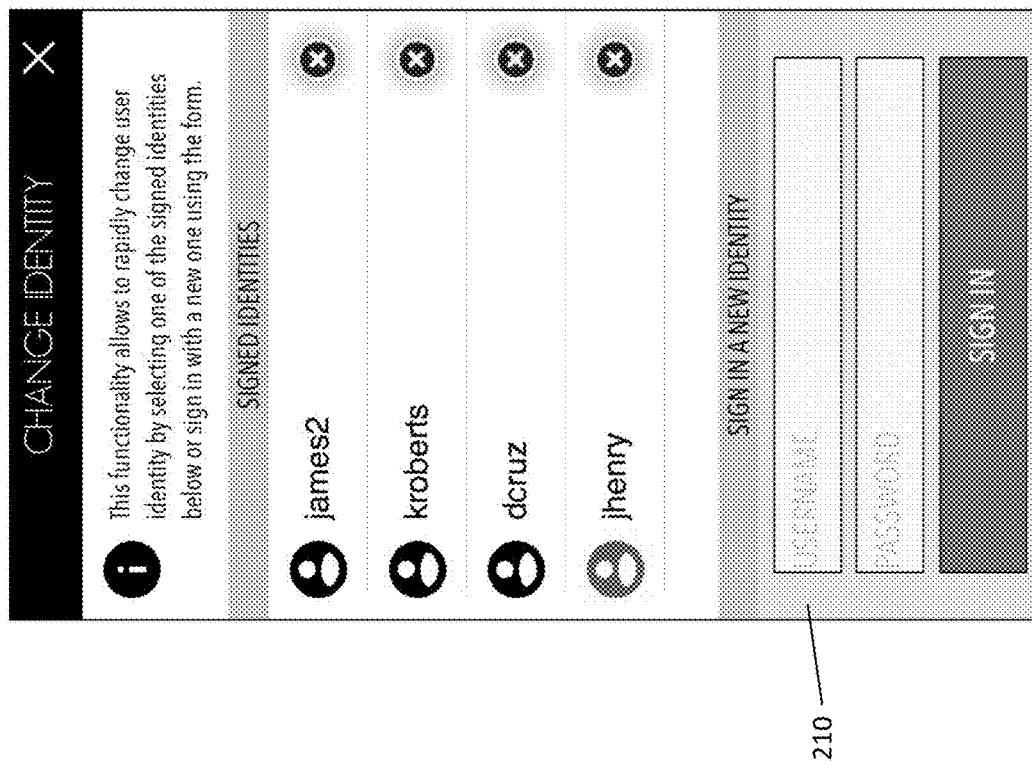
Figure 3D:
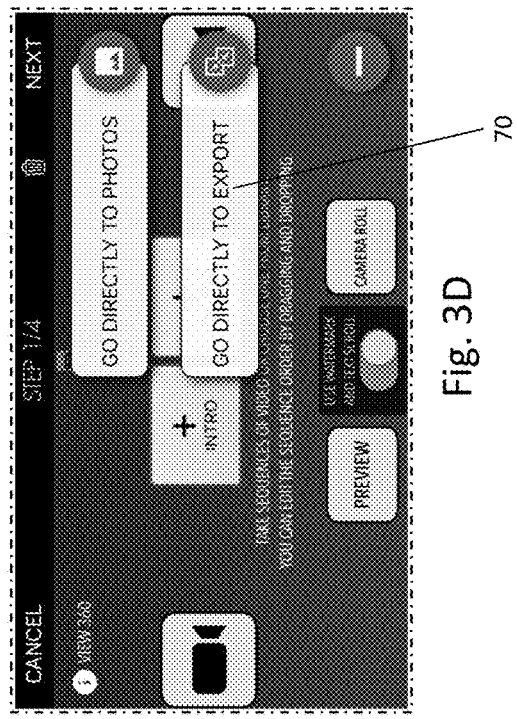
FIGS. 3C, 3D and 3E are screenshots of the multimedia dashboard video creation and editing screens.
Figure 3C:
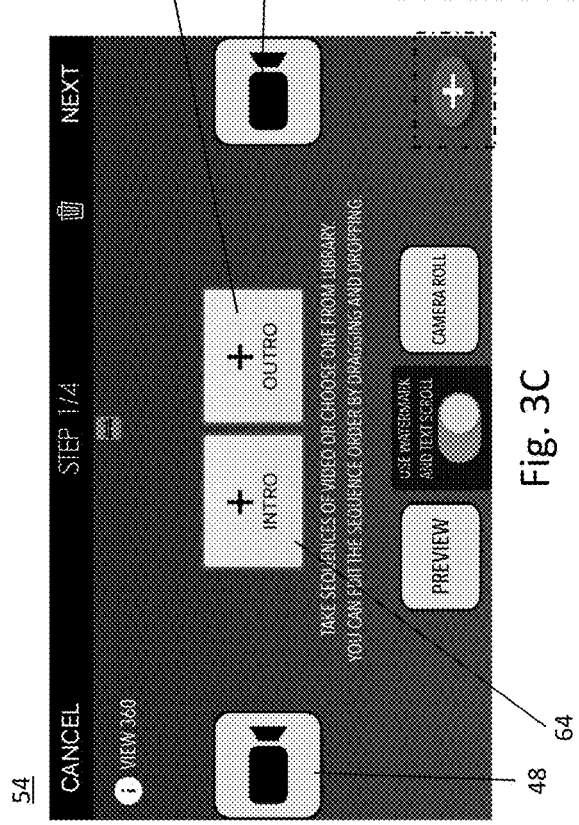
Figure 3E:
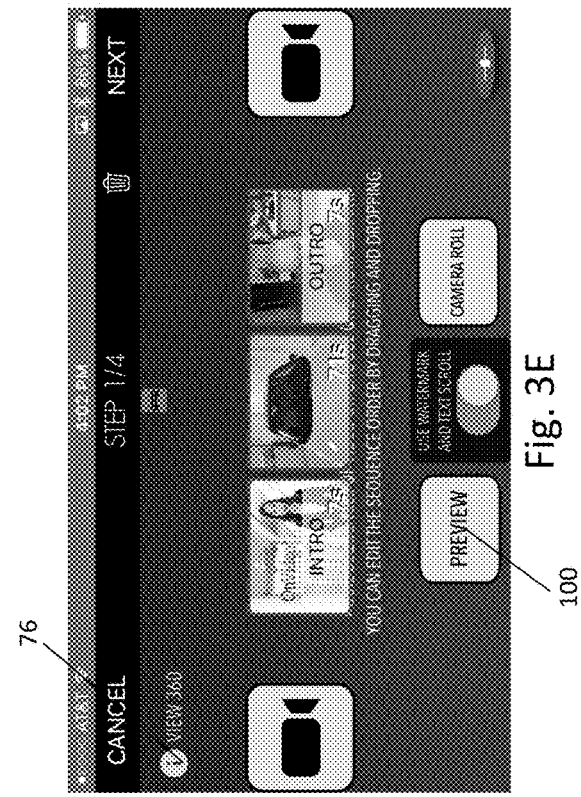
Figure 6A:
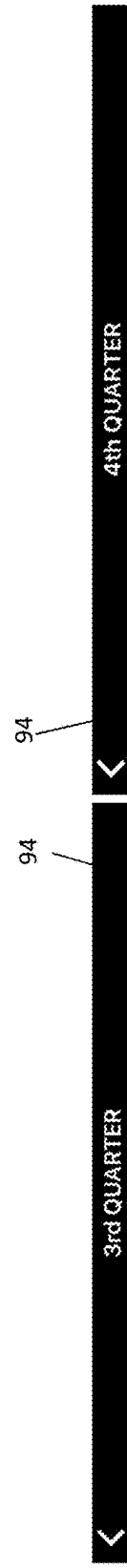
FIGS. 6A, 6B, 6C and 6D are screenshots of the multimedia dashboard View 360 four sequence video prompt screens.
Figure 6B:
Figure 6C:
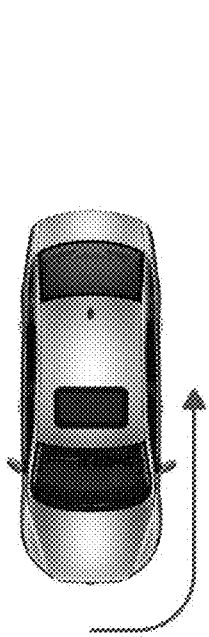
Figure 6D:
Figure 10C:
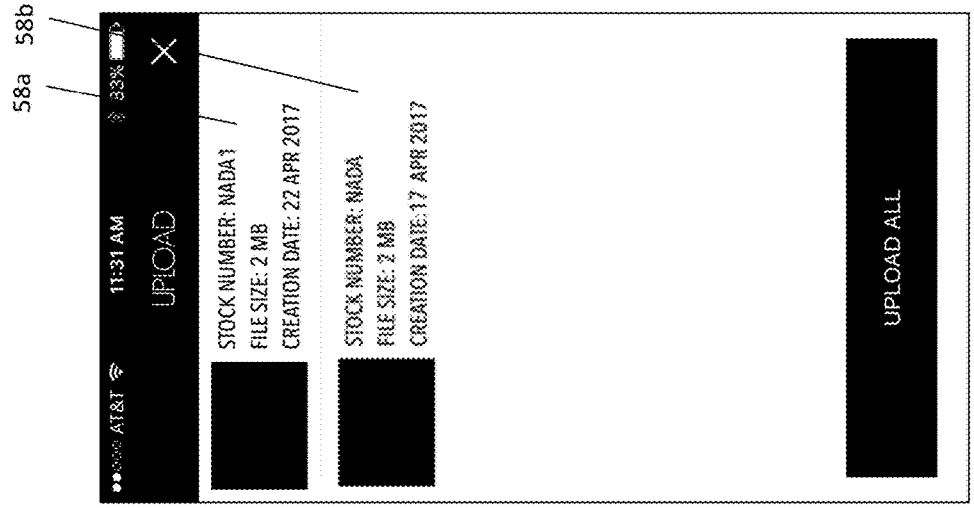
FIGS. 10A, 10B and 10C are screenshots of the multimedia dashboard work-in-progress screen, upload prompt screen and upload screen, respectively.
Figure 10B:
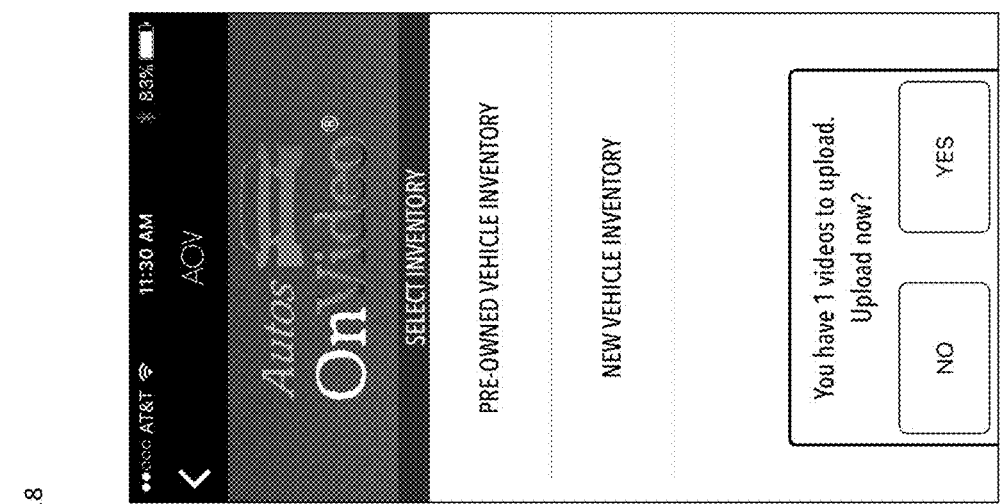
Figure 10A:
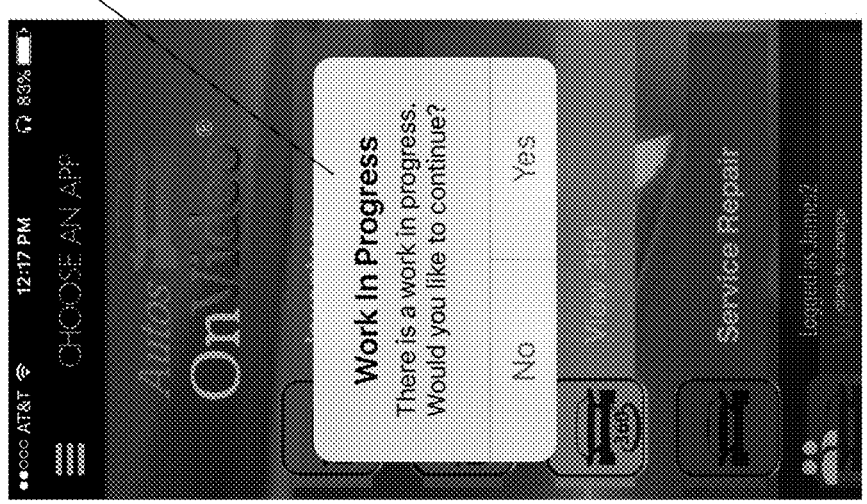

Other aspects of the multimedia system include allowing authorized users to share a device without having to repeatedly login and logout to access their custom profile, such as shown in FIG. 3A. As a protection against losing data and work as a result of catastrophic failure, an auto-save of work is performed as the user progresses through each step in the process. When the user logs back into the mobile app, they are informed that there is work-in-progress 118 and may continue where they left off, such as shown in in FIG. 10A. As shown in FIGS. 10B and 10C, users can work on multiple promotions 58a and 58b at a time and save their work as they go before uploading the completed multimedia sales promotion.

Moreover, this system can be used to create custom digital brochures for each item, so that promotional materials can be tailored to individual buyers for a given item. Once the photos and videos have been edited, and the digital brochures generated, the materials can be uploaded to distribution server for distribution to the retailer's website, online shopping bazaars, third-party marketing services, and/or social media portals. The individual digital brochures or links to the brochures can also be communicated to customers or potential buyers.

The computing device described herein is preferable a handheld smartphone but may include any mobile computer including, but not limited to a tablet computer and a laptop computer. As explained above, the multimedia dashboard application is a software program that is executed as machine-readable code on a computer processor for causing, when executed, the steps of the multimedia creation and management system. The multimedia dashboard application can either be loaded directly onto the computing device or accessed on a hosted platform by the computing device using a web browser. Additionally, in a cloud computing environment, the computing device may access the multimedia dashboard application software via the web browser using the internet, extranet, intranet, host server or internet cloud.

The computer-based data processing system and method described above is for purposes of example only, and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described in detail, and the details of features known in the art are omitted. For the same reason, the computer hardware is not described in detail. It should thus be understood that the invention is not limited to any specific computer language, program, or computer. It is further contemplated that the present invention may be run on a stand-alone computer system, or may be run from a server computer system that can be accessed by a plurality of client computer systems interconnected by a communications network. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An integrated system for recording, editing, and managing distribution of a multimedia sales promotion, comprising:
    an inventory database of products in a sales inventory, wherein the inventory database comprises a set of multimedia segments corresponding with product information about the respective products in the sales inventory, and wherein the set of multimedia segments is comprised of a plurality of product photographs, a plurality of product videos, and a plurality of product audios;
    a distribution server in communication with the inventory database; and
    a first computing device in networked communication with the inventory database and in operative communication with the distribution server, wherein the computing device comprises a computer processor, a communications module, a memory module, a camera, a microphone, a display screen, a user interface, and a multimedia dashboard application running on the computer processor, wherein the user interface receives a first set of user inputs for operating the multimedia dashboard application, wherein the multimedia dashboard comprises an item selector, a recording module, a multimedia editor, and a distribution controller, wherein the multimedia dashboard application selects at least one of the multimedia segments for a first modification to the selected multimedia segment in the multimedia editor according to a first user input to the item selector, wherein the multimedia dashboard application activates at least one of the camera and the microphone to produce a new multimedia segment according to a second user input to the recording module, wherein the multimedia dashboard application produces a first multimedia promotion with a second modification to the new multimedia segment and the selected multimedia segment according a third user input to the multimedia editor, wherein the multimedia dashboard application communicates the first multimedia promotion to the inventory database through the communications module according to a fourth user input, and wherein the multimedia dashboard application publishes or communicates the first multimedia promotion through the distribution server according to a fifth user input to the distribution controller.

2. The system of claim 1, further comprising a second computing device running the multimedia dashboard application is in communication with the inventory database and the distribution server, wherein the second computing device receives a second set of user inputs for operating the multimedia dashboard application running on the second computing device, and wherein the multimedia editor in the multimedia dashboard application modifies the multimedia segments and produces a second multimedia promotion.

3. The system of claim 1, wherein the distribution server distributes the first multimedia promotion to at least one of a retailer's website, an online shopping bazaar, a social media website, a third-party marketing service, and a potential buyer.

4. The system of claim 1, wherein the first multimedia promotion is comprised of a first video, wherein the multimedia editor further comprises at least one of an intro guide and an outro guide, and wherein a sixth user input to at least one of the intro guide and the outro guide produces a video segment with voiceover in a sequential order with the first multimedia promotion.

5. The system of claim 4, wherein the multimedia editor further comprises a video sorter, and wherein a seventh user input to at least one of the video sorter rearranges the sequential order between the video segment with voiceover and the first multimedia promotion.

6. The system of claim 1, wherein the multimedia editor further comprises a screen with a voiceover script field and a video field.

7. The system of claim 1, wherein the multimedia editor further comprises a plurality of background music tracks, wherein the product audios are a plurality of voiceovers describing the products, and wherein a sixth user input to the multimedia editor selects one of the background music tracks for the first multimedia promotion.

8. The system of claim 1, wherein the multimedia dashboard application further comprises a 360° view template, wherein the 360° view template is comprised of a 360° recording template in the recording module and a 360° editor in the multimedia editor, wherein the 360° recording template accepts a plurality of videos in a predefined sequence around a periphery of a product, and wherein the 360° editor is comprised of an automated selection of a plurality of image frames extracted from the videos.

9. The system of claim 1, wherein the photo editor further comprises a silhouette photo template comprising a plurality of silhouette images and a silhouette sorter for rearranging a publication order of the silhouette images.

10. The system of claim 1, wherein the multimedia dashboard application further comprises a livestream module comprising a live video feed and a live text chat, wherein the sales inventory is an inventory of vehicles, and wherein the multimedia dashboard application further comprises vehicle servicing module with access to customer information in the inventory database.

11. An integrated system for recording, editing, and managing distribution of a multimedia sales promotion, comprising:
- an inventory database of vehicles in a sales inventory, wherein the inventory database comprises a set of multimedia segments corresponding with vehicle information about the respective vehicles in the sales inventory, and wherein the set of multimedia segments is comprised of a plurality of vehicle photographs, a plurality of vehicle videos, and a plurality of vehicle audios;
- a distribution server in communication with the inventory database;
- a first computing device in networked communication with the inventory database and in operative communication with the distribution server, wherein the computing device comprises a computer processor, a communications module, a memory module, a camera, a microphone, a display screen, a user interface, and a multimedia dashboard application running on the computer processor, wherein the user interface receives a first set of user inputs for operating the multimedia dashboard application, wherein the multimedia dashboard comprises an item selector, a recording module, a multimedia editor, and a distribution controller, wherein the multimedia dashboard application selects at least one of the multimedia segments for a first modification to the selected multimedia segment in the multimedia editor according to a first user input to the item selector, wherein the multimedia dashboard application activates at least one of the camera and the microphone to produce a new multimedia segment according to a second user input to the recording module, wherein the multimedia dashboard application produces a first multimedia promotion with a second modification to the new multimedia segment and the selected multimedia segment according a third user input to the multimedia editor, wherein the multimedia dashboard application communicates the first multimedia promotion to the inventory database through the communications module according to a fourth user input, and wherein the multimedia dashboard application publishes or communicates the first multimedia promotion through the distribution server according to a fifth user input to the distribution controller; and
- a second computing device running the multimedia dashboard application is in communication with the inventory database and the distribution server, wherein the second computing device receives a second set of user inputs for operating the multimedia dashboard application running on the second computing device, and wherein the multimedia editor in the multimedia dashboard application modifies the multimedia segments and produces a second multimedia promotion.

12. The system of claim 11, wherein the first multimedia promotion is comprised of a first video, wherein the multimedia editor further comprises at least one of an intro guide and an outro guide, and wherein a sixth user input to at least one of the intro guide and the outro guide produces a video segment with voiceover in a sequential order with the first multimedia promotion.

13. The system of claim 11, wherein the multimedia editor further comprises a screen with a voiceover script field and a video field.

14. The system of claim 11, wherein the multimedia editor further comprises a plurality of background music tracks, wherein the vehicle audios are a plurality of voiceovers describing the vehicles, and wherein a sixth user input to the multimedia editor selects one of the background music tracks for the first multimedia promotion.

15. The system of claim 11, wherein the multimedia dashboard application further comprises a 360° view template, wherein the 360° view template is comprised of a 360° recording template in the recording module and a 360° editor in the multimedia editor, wherein the 360° recording template accepts a plurality of videos in a predefined sequence around a periphery of a product, and wherein the 360° editor is comprised of an automated selection of a plurality of image frames extracted from the videos.

16. A method of recording, producing, and distributing a multimedia promotion, comprising:
- selecting a set of multimedia segments relating to a corresponding set of products in an inventory database via a multimedia dashboard application executing on a computer processor and without adding another application, wherein the computer processor is operatively communicating with a distribution server in communication with the inventory database, and wherein the multimedia segments are comprised of a plurality of photos, a plurality of videos, and a plurality of audios;
- recording a new multimedia segment using the multimedia dashboard application executing on the computer processor;
- editing at least one of the new multimedia segment and the selected multimedia segments using the multimedia dashboard application executing on the computer processor to produce at least one edited multimedia segment;
- generating, via the multimedia dashboard application executing on the computer processor the multimedia promotion with the edited multimedia segment;
- uploading the multimedia promotion from the computer processor to the distribution server in communication with the inventory database via the multimedia dashboard application executing on the computer processor; and
- controlling a distribution of the multimedia promotion to a set of potential buyers by the distribution server with the multimedia dashboard application executing on the computer processor.

17. The method of claim 16, further comprising the steps of:
- recording a custom voiceover track for the new multimedia segment using the multimedia dashboard application executing on the computer processor, wherein the new multimedia segment is a new video;
- adding the custom voiceover track to the new video using the multimedia dashboard application executing on the computer processor to produce a custom video; and
- combining the custom video with the set of selected multimedia segments using the multimedia dashboard application executing on the computer processor to produce the multimedia promotion, wherein the custom video is at least one of an intro video and an outro video in sequence with the set of selected multimedia segments.

18. The method of claim 16, wherein the multimedia dashboard application further comprises a 360° view function comprised of the steps of recording a plurality of videos in a predefined sequence around a periphery of a product, automatically selecting a plurality of image frames extracted from the videos, and combining the selected image frames into a rotatable 360° view.

19. The method of claim 16, wherein the computer processor executes the steps according to a set of user inputs entered into a first mobile computer, wherein the computer processor is at least one of a local processor within the first mobile computer and a cloud-based computer processor in networked communication with the first mobile computer through a web browser interface.

20. The method of claim 16, further comprising the step of executing the multimedia dashboard application on a first mobile computer and a second mobile computer, wherein the first mobile computer uploads the multimedia promotion to the inventory database, and wherein the second mobile computer edits at least one of the multimedia segments in the multimedia promotion with a custom video and a voiceover track.

* * * * *